(12) United States Patent
Back et al.

(10) Patent No.: US 11,303,636 B2
(45) Date of Patent: Apr. 12, 2022

(54) SYSTEMS AND METHODS FOR ROUTING TRAFFIC ORIGINATING FROM A COMMUNICATION DEVICE

(71) Applicant: TELEFONAKTIEBOLAGET LM ERICSSON (PUBL), Stockholm (SE)

(72) Inventors: Heidi-Maria Back, Helsinki (FI); Jari Arkko, Kauniainen (FI); Tero Kauppinen, Espoo (FI); Jimmy Kjällman, Espoo (FI); Miika Komu, Helsinki (FI); Tomas Mecklin, Kyrkslätt (FI); Patrik Salmela, Espoo (FI); Mohit Sethi, Helsinki (FI); Le Wang, Helsinki (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 45 days.

(21) Appl. No.: 15/755,605

(22) PCT Filed: Aug. 28, 2015

(86) PCT No.: PCT/SE2015/050910
§ 371 (c)(1),
(2) Date: Feb. 27, 2018

(87) PCT Pub. No.: WO2017/039494
PCT Pub. Date: Mar. 9, 2017

(65) Prior Publication Data
US 2019/0028475 A1 Jan. 24, 2019

(51) Int. Cl.
*H04L 29/06* (2006.01)
*H04W 12/084* (2021.01)
(Continued)

(52) U.S. Cl.
CPC .......... *H04L 63/0892* (2013.01); *H04L 45/38* (2013.01); *H04L 47/20* (2013.01);
(Continued)

(58) Field of Classification Search
CPC ...... H04L 63/0892; H04L 45/38; H04L 47/20
See application file for complete search history.

(56) References Cited

U.S. PATENT DOCUMENTS

| 9,038,151 B1 | 5/2015 | Chua et al. |
| 2005/0083955 A1* | 4/2005 | Guichard ............ H04L 12/4641 370/409 |

(Continued)

FOREIGN PATENT DOCUMENTS

WO 2012098596 A1 7/2012

OTHER PUBLICATIONS

International Search Report and Written Opinion issued in Application No. PCT/SE2015/050910 dated Mar. 2, 2016, 11 pages.
(Continued)

*Primary Examiner* — Jeffrey C Pwu
*Assistant Examiner* — Rodman Alexander Mahmoudi
(74) *Attorney, Agent, or Firm* — Sage Patent Group

(57) ABSTRACT

Using an authentication server to program network elements, such as a network node, in accordance with software-defined networking techniques in order to establish a traffic flow rule for a communication device or user of the communication device. After successfully authenticating a communication device or user, the authentication server and/or network node may use an identifier received at the authentication server in connection with the authentication procedure in order to obtain a traffic flow rule for the communication device. The traffic flow rule may be established at the network node or forwarded to a second network node configured to receive network packets from the communi-
(Continued)

cation device. The first identifier may be any one of a user identifier identifying a user, an application identifier identifying an application, and a device identifier unique to the communication device.

16 Claims, 6 Drawing Sheets

(51) Int. Cl.
*H04W 12/086* (2021.01)
*H04L 45/00* (2022.01)
*H04L 47/20* (2022.01)
*H04W 28/02* (2009.01)
*H04L 45/64* (2022.01)
*H04W 84/12* (2009.01)

(52) U.S. Cl.
CPC .......... *H04L 63/0876* (2013.01); *H04L 63/20* (2013.01); *H04W 12/084* (2021.01); *H04W 12/086* (2021.01); *H04W 28/0268* (2013.01); *H04L 45/64* (2013.01); *H04W 84/12* (2013.01)

(56) References Cited

U.S. PATENT DOCUMENTS

| | | | |
|---|---|---|---|
| 2007/0124802 A1* | 5/2007 | Anton, Jr. ............. | H04W 80/00 726/3 |
| 2008/0130601 A1 | 6/2008 | Kim et al. | |
| 2009/0158032 A1* | 6/2009 | Costa .................... | H04L 63/062 713/156 |
| 2010/0242105 A1* | 9/2010 | Harris .................... | H04L 63/08 726/12 |
| 2011/0314517 A1 | 12/2011 | Yamato et al. | |
| 2014/0307744 A1* | 10/2014 | Dunbar .................. | H04L 45/44 370/401 |
| 2016/0226869 A1* | 8/2016 | Vachiravel .......... | H04L 63/0876 |
| 2017/0223039 A1* | 8/2017 | Mont .................. | H04L 63/1466 |

OTHER PUBLICATIONS

Office Action dated May 19, 2020 for European Patent Application No. EP 15771734.9, 6 pages.

* cited by examiner

SYSTEMS AND METHODS FOR ROUTING TRAFFIC ORIGINATING FROM A COMMUNICATION DEVICE

CROSS REFERENCE TO RELATED APPLICATION(S)

This application is a 35 U.S.C. § 371 National Stage of International Patent Application No. PCT/SE2015/050910, filed Aug. 28, 2015, designating the United States, the disclosure of which is incorporated by reference.

TECHNICAL FIELD

Aspects of this disclosure relate routing traffic originating from a communication device.

BACKGROUND

Network access services may be provided to a communication device (e.g., a smartphone, PDA, tablet, computer, or some other electronic device) through mobile communication networks, local area networks (LAN), wireless local area networks (WLAN), and other means. An authentication server and authentication protocol may be used to receive and authenticate user requests or device requests to access computer resources on a network. For example, IEEE 802.1X is an IEEE Standard for Port-based Network Access Control (PNAC) and it is part of the IEEE 802.1 group of networking protocols that provide an authentication mechanism to devices requesting to attach to a LAN or WLAN. IEEE 802.1X defines the encapsulation of the Extensible Authentication Protocol (EAP) over IEEE 802, referred to as "EAP over LAN" or "EAPOL."

Authentication may involve three parties: a client device, an authenticator, and an authentication server. The authenticator may be a network access point, such as an Ethernet switch or wireless access point. The authenticator may not allow the client device to access the protected side of a network (e.g., resources in a LAN or WLAN) until the communication device's identity has been validated and authorized.

The authentication server may be an authentication, authorization, and accounting ("AAA") server. An AAA server is a server program that handles user requests or device requests to access computer resources. An AAA server may use a Diameter or a Remote Authentication Dial-In User Service (RADIUS) protocol for exchanging messages. A communication device may authenticate itself to a network using an authentication protocol, such as Challenge-Handshake Authentication Protocol (CHAP), Authentication and Key Agreement (AKA), or other Extensible Authentication Protocol (EAP) methods. Rather than the authenticator (e.g., access point) performing its half of the authentication process directly, it may rely on one or more authentication protocols and a backend authentication server to authenticate a communication device. Thus, an access point may use a backend authentication server, e.g., an AAA server that is separate and distinct from the serving node, instead of authenticating locally.

In many networks, it is desirable to provide different services for different users or devices. For example, roaming users may get a different level of service than users of the operator providing a particular network. Additionally, users belonging to a particular operator may be directed to particular service. Some of the ways in which this kind of differentiation can be performed include informing the access network about specific arrangements over the authentication responses sent back from the authentication exchange. For instance, quality of service, tunneling, and other parameters can be set at the access point. However, the authentication server has little influence over the rest of the network.

SUMMARY

In order to build a simple future fifth generation (5G) core network on top of a virtualized cloud environment where several operators can acquire virtual computing instances, it is advantageous to route traffic originating from a communication device based on an identifier transmitted by the client device, such as, for example, a user identifier, an application identifier, or a device identifier. The 5G core network should be flexible, so that the top-level applications may evolve and innovate faster than they can today. However, there is currently no concrete working solution known for reprogramming network flows based on such an identifier.

In order to address these problems and others, the present disclosure provides techniques for enabling an authentication server to program (and re-program) network elements (e.g., routers, switches) beyond a network access point. In particular, an existing authentication exchange provides information about a particular client communication device to the backend authentication server. For example, an identifier, such as a user identifier, home network operator identifier, communication device identifier (e.g., MAC address, IP addresses), network address identifier (NM) and so forth may typically be provided from the client communication device to the authentication server as part of an authentication procedure. The authentication server in turn may use this identifier in new ways, such as programming and re-programming other network elements through software-defined networking (SDN) mechanisms. The programming may serve multiple purposes, one being programming routing rules so that the network access client may be attached to the right virtual instance serving a group of customers.

The procedures disclosed herein provide a technological improvement to the field of SDN and network traffic routing and offer several key advantages. For example, one advantage of the present disclosure is that the procedures disclosed herein are backwards compatible with existing network access clients and access networks, e.g., no changes are required on access points or authentication protocols; only changes in the core network may be needed. Another advantage is that the network may include a completely programmable network fabric where many virtual operators may share the same cloud infrastructure. Another advantage is that no additional burden may be placed on the client/communication device or the access network. Another advantage is that fine grained quality of service (QoS) and flow management may be established for each user. Another advantage is that the proposed procedures may be applied to various network elements and purposes, e.g., where the network elements are SDN controlled.

Accordingly, in one aspect there is provided a method routing traffic originating from a communication device. The method includes the step of receiving, at an authentication server, a first message including information indicating that the communication device or a user of the communication device is requesting access to a resource. The method further includes the step of authenticating, by the authentication server, the communication device or the user of the communication device in accordance with an authentication protocol. The method further includes the step of, after the device or the user is authenticated, establishing a traffic flow rule for traffic transmitted by the device based on a first identifier, wherein the first identifier is one of a user identifier identifying a user, an application identifier identifying an application, and a device identifier unique to the device, and the step of establishing the traffic flow rule includes the authentication server transmitting to a network node a second message including one or more of the first identifier and the device identifier.

In another aspect there is provided an authentication server including a data processing system and a network interface coupled to the data processing system. The data processing system is configured such that, in response to receiving a first message including information indicating that a communication device or a user of the communication device is requesting access to a resource, the data processing system: authenticates the communication device or the user of the communication device in accordance with an authentication protocol. The data processing system, after the communication device or the user is authenticated, further establishes a traffic flow rule for traffic transmitted by the communication device based on a first identifier, wherein the first identifier is one of a user identifier identifying a user, an application identifier identifying an application, and a device identifier unique to the device. The establishing a traffic flow rule further includes the data processing system using the network interface to transmit to the network node a second message including one or more of the first identifier and the device identifier.

The above and other aspects and embodiments are described below with reference to the accompanying drawings.

BRIEF DESCRIPTION OF DRAWINGS

The accompanying drawings, which are incorporated herein and form part of the specification, illustrate various embodiments.

DETAILED DESCRIPTION

Figure 1:
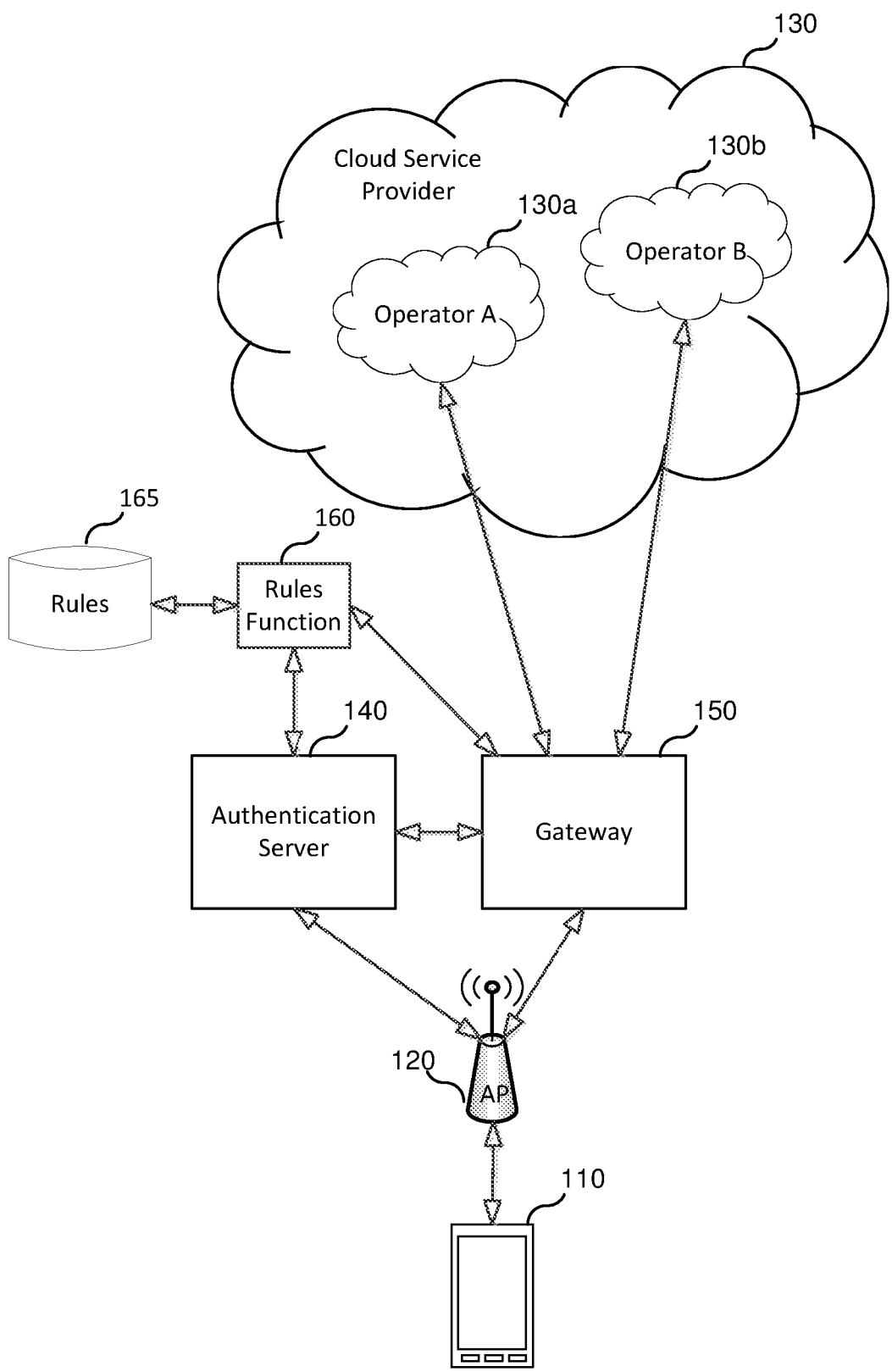
FIG. 1 is a block diagram of a network according to some embodiments.

FIG. 1 is a block diagram of a network, according to some embodiments. Arrows between elements of FIG. 1 indicate that the elements are able to communicate with each other, e.g., via a wireless or wired connection. FIG. 1 shows a communication device 110 in communication with an access point 120. In some embodiments, communication device 110 may be a wireless communication device and the access point 120 may be a wireless access point, and the client device 110 and access point 120 exchange data over a wireless link. In other embodiments, communication devices 110 may be in communication with the access point 120 via a hardwire connection, such as an Ethernet cable.

The access point 120 is a device that allows the communication device 110 to access a network 130. For example, the access point 120 may be a stand-alone device coupled to a router, or may be an integral component of a router. In some embodiments, the access point 120 may be a standard wireless 802.11 channel access point, a 3G access point, a 4G access point, or other radio frequency technology access point.

The access point 120 is in communication with an authentication server 140 and a gateway 150. In some embodiments, the authentication server 140 may be a Diameter or RADIUS server, or an AAA server that handles requests from client device 110 for access to computer resources (e.g., in network 130) and provides authentication, authorization, and accounting services. In some embodiments, the AAA server 140 may further keep track of user's accounting sessions.

The gateway 150 is a network point that serves as the entrance to network 130. For example, the gateway 150 may be a network router or a switch.

The authentication server 140 and/or gateway 150 may be in communication with a rules function 160 and a rules database 165, described in further detail below in connection with FIGS. 2-5. In some embodiments, after successful authentication of a communication device/user 110, the authentication server 140 and/or a gateway 150 may obtain a traffic flow rule from a rules database 165 via the rules function 160. The traffic flow rule(s) may be stored at the gateway 150 and are used to appropriately route traffic for the communication device 110 through a virtual infrastructure. For example, as shown in FIG. 1, traffic from communication device 110 may be routed by the gateway 150 through the virtual infrastructure in network 130 according to one or more traffic flow rules. For example, traffic may be routed based on the flow rule(s) to a first operator's virtual instance 130a and/or to a second operator's virtual instance 130b.

In embodiments where network 130 is a virtual cloud-based LAN or WLAN network, gateway 150 may be a virtual switch in the virtual network 130, such as, an Open vSwitch (OVS). OVS is an open-source implementation of a distributed virtual multilayer switch and can operate both as a software-based network switch running on a virtual machine hypervisor and as a control stack for dedicated switching hardware.

FIG. 1 further depicts a network 130 with operators 130a-b. In some embodiments, network 130 may be offered by a cloud network provider and portions of the network infrastructure may be leased to multiple virtual network operators. Thus, multiple virtual network operators may run separate instances 130a-b on the same network 130 infrastructure. Virtualized networks or cloud environments make it possible to provide a pool of resources that are potentially shared by multiple operators. The benefit in this approach is the capability to provide services for the operator's customers without a direct requirement to invest in the infrastructure in some physical location or even country. Instead, an operator can lease computation power from a local cloud service provider and implement the required software components in the cloud service provider's environment. Such a cloud environment is required to support customers for multiple operators and to route traffic for each operator's customer accordingly.

In preferred embodiments, network 130 is supported by software-defined networking (SDN) architecture. SDN architectures decouple network control and forwarding functions, and thus network control is directly programmable and the underlying infrastructure is abstracted from applications and network services. Thus, network administrators may dynamically adjust network-wide traffic flow in order to address changing conditions. Network intelligence may be centralized in a software-based SDN control that maintains a global view of the network. An SDN controller is an application in software-defined networking (SDN) that manages flow control to enable intelligent networking. SDN controllers are based on protocols, such as OpenFlow, that allow servers to control the routing behavior of the switches.

Figure 2:
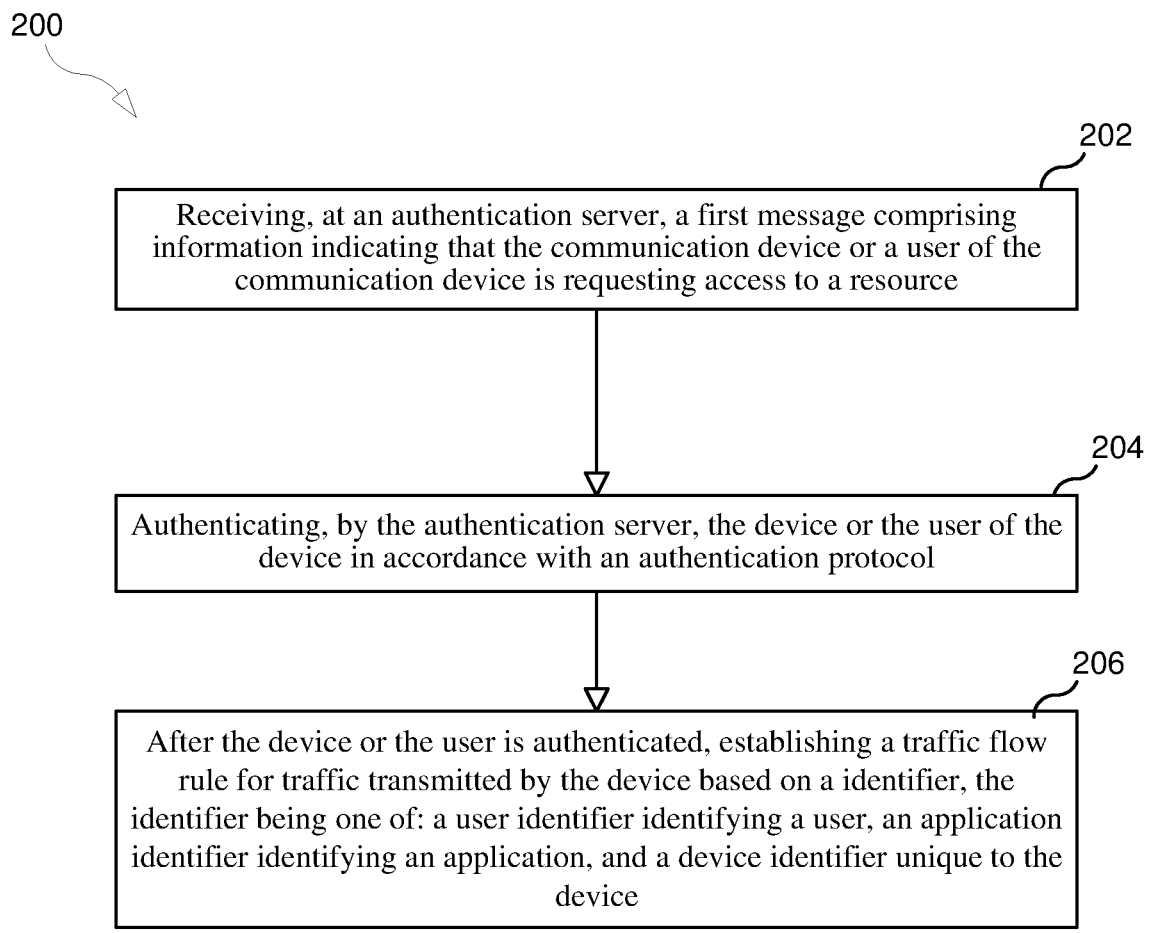
FIG. 2 is a flow chart illustrating a process according to some embodiments.

FIG. 2 is a flow chart illustrating a process 200, according to some embodiments. In some embodiments, process 200 may be performed by an authentication server 140, which may be an AAA authentication server 140 that uses a Diameter or RADIUS protocol. In some embodiments, process 200 may be performed by an authentication server 140 and gateway 150.

In step 202, the authentication server 140 receives a first message comprising information indicating that a communication device 110 or a user of the communication device 110 is requesting access to a resource. For example, the requested resource may be associated with a service provided by a node in network 130. As described in further detail below in connection with FIG. 5, a communication client 110 may discover the access point 120 based on beacons and/or probes, and then the communication client 110 and access point 120 negotiate security capabilities and establish a secure channel (e.g., an 802.11 channel) based upon successful authentication.

In step 204, the authentication server 140 authenticates the communication device 110 or the user of the communication device 110 in accordance with an authentication protocol. Upon discovering that the access point 120 requires an authentication procedure, the client device 110 may transmit one or more message to the authentication server 140 via an access point 120 in accordance with an authentication protocol, where one or more of the messages include a device identifier, user identifier, and/or an application identifier.

In step 206, after the communication device 110 or the user of the communication device 110 is authenticated, a traffic flow rule for traffic transmitted by the communication device 110 is established based on an identifier. In some embodiments, the establishment of a traffic flow rule in step 206 may be performed by the authentication server 140, the rules function 160, the gateway 150, or any combination of these. The identifier may be one or more of a user identifier for identifying a user, an application identifier for identifying an application, and/or a device identifier for identifying a device. For example, the identifier may include one or more of: a MAC address, a mobile phone number, an application ID (e.g., a social network ID), a Network Address Identifier (NAI), an Internet Protocol (IP) address, an OpenID, an open standard for authorization (OAuth) identifier (e.g., an access token), a Shibboleth identifier, etc. A combination of identifiers (e.g., a MAC address and NAI) may also be used to establish the traffic flow rule.

Figure 3:
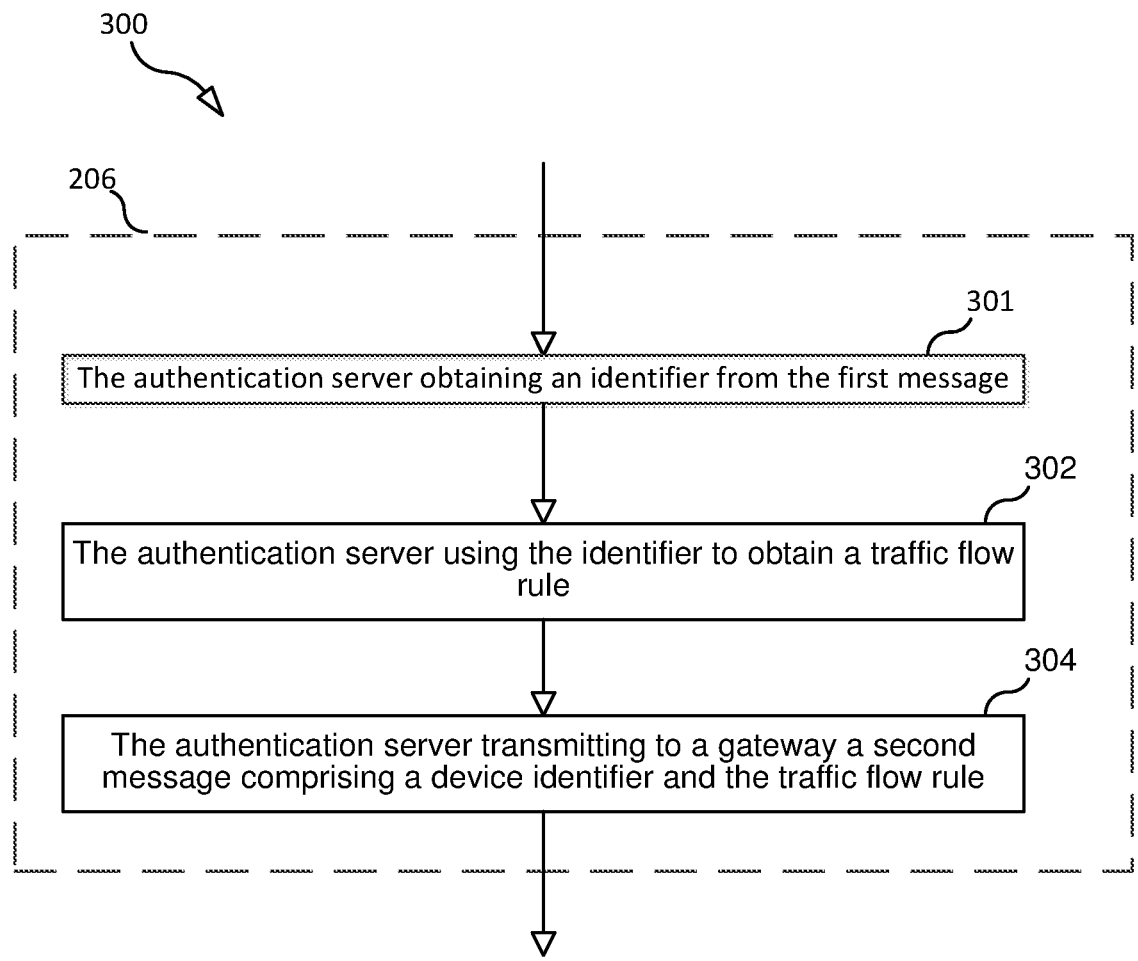
FIG. 3 is a flow chart illustrating a process performed by an authentication server according to some embodiments.

FIG. 3 is a flow chart illustrating a process 300, according to some embodiments, for accomplishing step 206. In the embodiment show, the process is performed by authentication server 140. Process 300 may begin in step 301, where the authentication server 140 obtains an identifier from the first message transmitted by the communication device 110.

In step 302, the authentication server 140 uses the obtained identifier to obtain a traffic flow rule. In some embodiments, the authentication server provides the identifier to a rules function 160, which in turn may use the identifier to query rules database 165 for a traffic flow rule mapped to the identifier. The rules function 160 may be a software component executing on the same computer as authentication server 140 or may be software executing on a separate device.

The rules database 165 may be a component of the computer that executes the authentication server 140 or an entirely separate device. The rules database 165 contains one or more traffic flow rules. In some embodiments, the traffic flow rules may steer the path of network packets transmitted by communication device 110 on a node-by-node (e.g., switch to switch) basis in network 130. The rules database 165 may comprise a packet forwarding table that specifies the rules for routing network packets. For example, the packet forwarding table may map an identifier (e.g., a device identifier, a user identifier, and/or an application identifier) to a destination (e.g., an IP address, a domain name, a network identifier, an output port). For instance, the table may include a first column for storing identifiers and a second column for storing destination information identifying a destination. The rules database 165 may include additional data fields and/or user profiles mapped to the identifier that specify, for example, user preference, a priority parameter, a quality of service (QoS) parameter, a tunneling parameter, a device type parameter, a device identifier, a time-to-live parameter, etc. For example, the traffic flow rules may be OpenFlow rules that may be pushed into physical hardware devices, such as access points 120 and switches/gateways 150 that specify how network packets may be directed through the virtual infrastructure of network 130.

Once the rules function 160 obtains from the rules database 165 one or more traffic flow rules (e.g., information identifying a destination or action), the rules function 160 may provide or transmit the obtained traffic flow rule(s) to the authentication server 140.

In step 304, the authentication server transmits to gateway 150 a second message comprising the obtained traffic flow rule and a device identifier, which may be the same as the identifier obtained in step 301 or which may be another identifier that was included in the first message. In this way, gateway 150 can map the traffic flow rule to the device identifier (e.g., it may update one of its own packet forwarding table with the device identifier and traffic flow rule) such that when gateway 150 receives via AP 120 a packet comprising the device identifier (e.g., a packet having its source address equal to the device identifier) the gateway can use the device identifier to retrieve the traffic flow rule and then process the packet (e.g., forward the packet, discard the packet, modify the packet, buffer the packet) in accordance with the traffic flow rule. In some embodiments, the second message may comprise additional information, such as a time-to-live parameter for the traffic flow rule. At the expiration of the time-to-live parameter, the traffic flow rule may be modified in gateway 150 and/or other network devices. For example, the traffic flow rule may be deleted from the gateway 150 and/or moved to another database, etc., when a user session is terminated. In some embodiments, such as where traffic is to be forwarded to a second network node, the authentication server 140 or gateway 150 may further transmit the obtained traffic flow rule and the identifier to the second network node.

Figure 4:
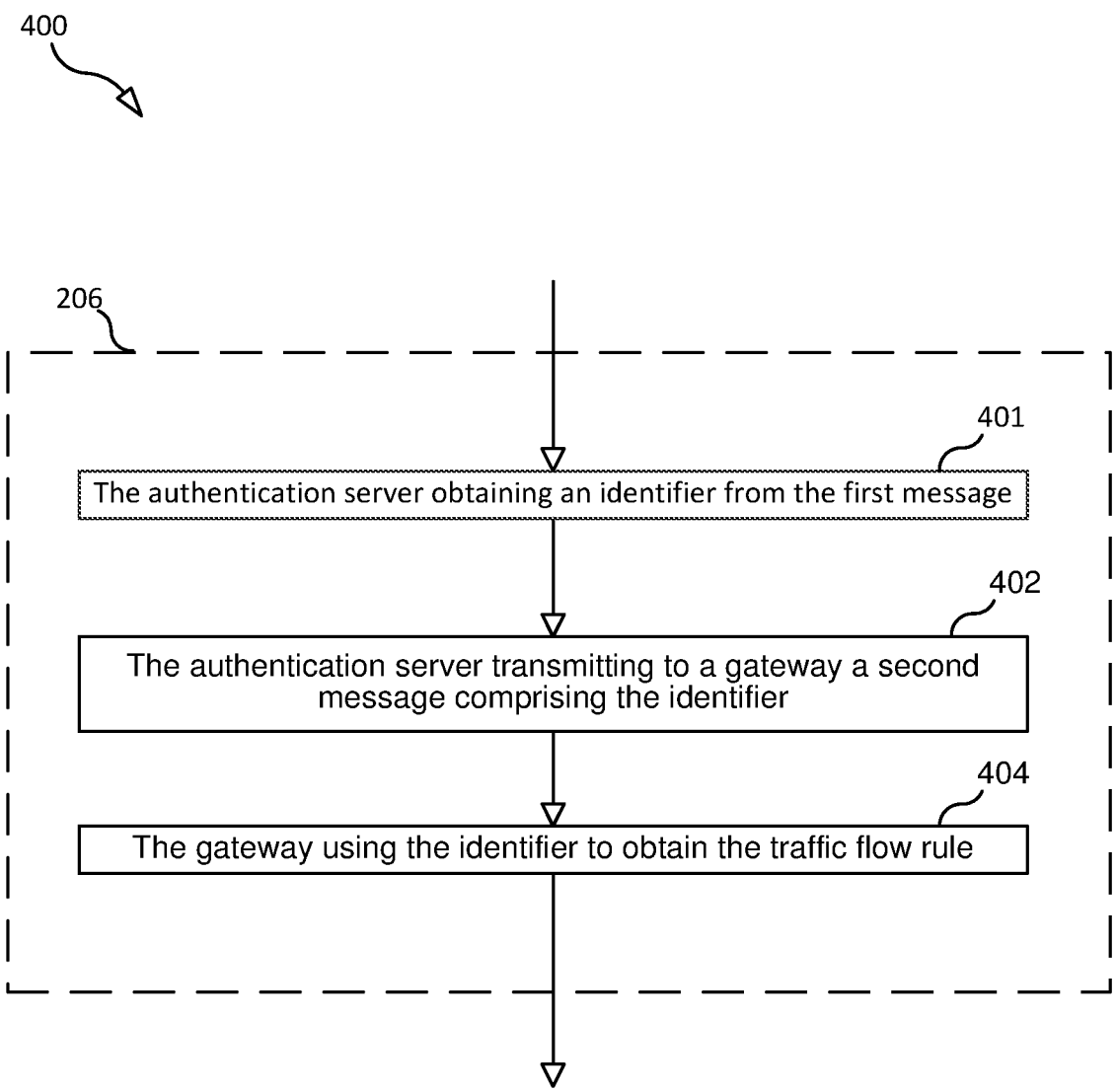
FIG. 4 is a flow chart illustrating a process performed by an authentication server and a gateway according to some embodiments.

FIG. 4 is a flow chart illustrating a process 400, according to some embodiments, for accomplishing step 206. In the embodiment shown, process 400 is performed by authentication server 140 and gateway 150. Process 400 may begin with step 401, where the authentication server 140 obtains an identifier from the first message transmitted by the communication device 110.

In step 402, the authentication server 140 transmits to a gateway 150 a second message comprising the identifier. If the identifier is not a device identifier for identifying the communication device 110 (e.g., the MAC address of device 110 or the IP address of device 110), the authentication server 140 may include in the second message a device identifier for identifying the communication device 110 in addition to the identifier obtained in step 401.

In step 404, the gateway 150 uses the identifier obtained in step 401 to obtain the traffic flow rule. As shown in FIG. 1, the gateway 150 may be in communication with a rules function 160. The rules function 160 may be a software component executing in the gateway 150 or may comprise software executing in a separate device. The rules function 160 is configured to access, for example, the rules database 165, as described above in connection with step 302 of FIG. 3. The gateway 150 may provide the identifier to the rules function 160, which in turn uses the identifier to look up one or more specific rules in the one or more tables of the rules database 165 associated with the identifier. Once the rules function 160 looks up and obtains one or more traffic flow rules from the rules database 165, the rules function 160 may provide or transmit the obtained traffic flow rule(s) to the gateway 150. The gateway 150 may in turn store the obtained traffic flow rule(s) in local storage such that the rules are mapped to the identifier obtained in step 401 (or a device identifier included in the second message, if any) and then use the obtained traffic flow rule(s) to route network packets associated with the communication device 110, as described above. In some embodiments, the gateway 150 or authentication server 140 may forward the obtained traffic flow rule(s) and the device identifier to a second node in network 130, where the second node is configured to receive network packets transmitted from the communication device 110.

In some embodiments where the network packets from communication device 110 are routed further via a second gateway or multiple gateways along a traffic flow path, the authentication server 140 may also reprogram the one or more additional gateways by transmitting the traffic flow rule to the additional nodes on the traffic flow path. Alternatively, in some embodiments where the network packets from communication device 110 are routed via second gateway, the gateway 150 may further transmit the traffic flow rule (e.g., that it received from the authentication server 140 or obtained directly via a rules function 160) to a second network node or gateway. Accordingly, in either scenario, multiple gateways may be configured to receive the network traffic transmitted by the communication device 110, and the traffic flow rule identifies a node in network 130 to which the second network node should forward the received traffic.

Figure 5:
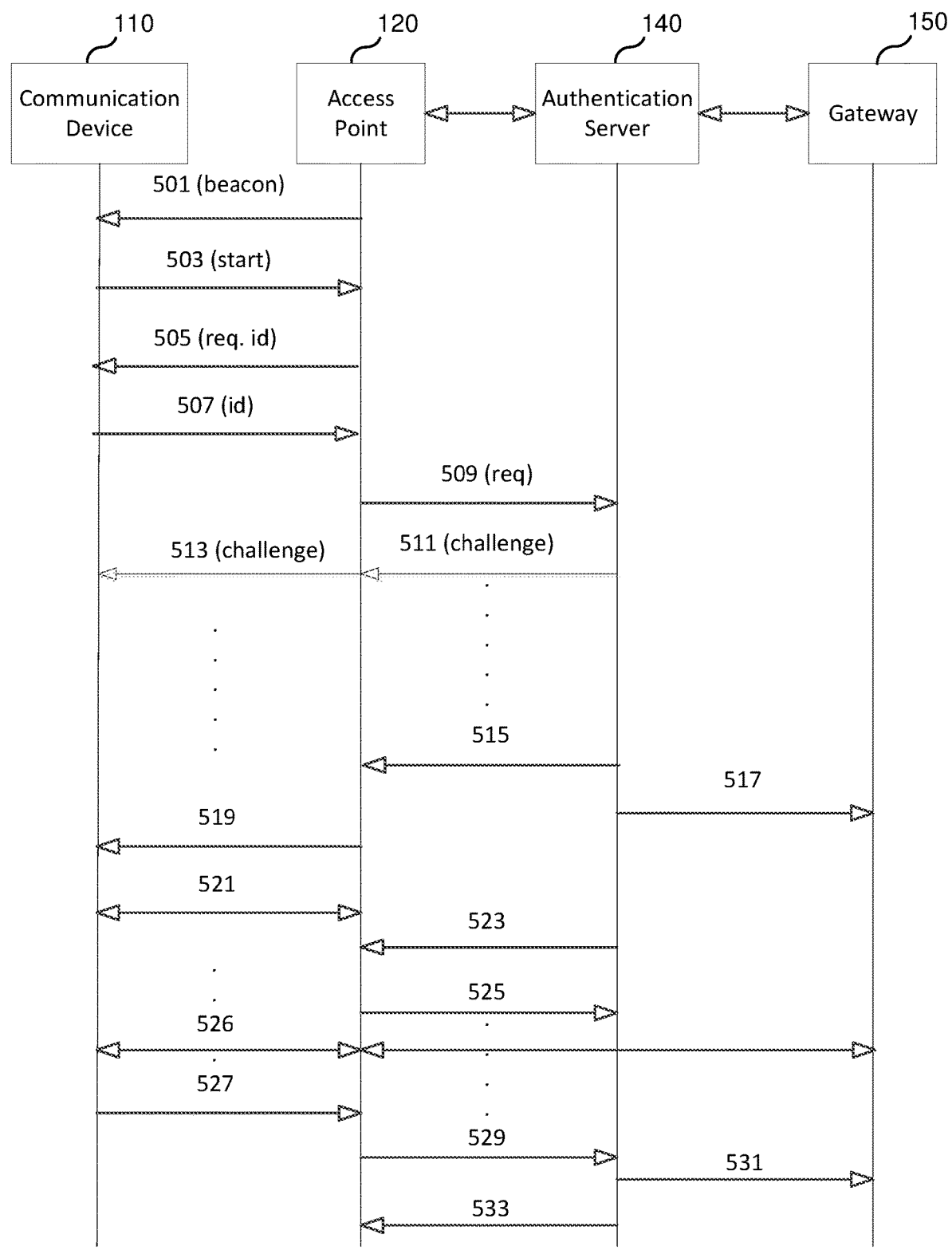
FIG. 5 is a message flow diagram illustrating a message exchange according to some embodiments.

FIG. 5 is a message flow diagram illustrating a message exchange according to some embodiments. FIG. 5 depicts a message exchange between the communication device 110, the access point 120, the authentication server 140, and the gateway 150. Additionally, while the present disclosure is not limited to a specific authentication procedure or protocol, for sake of illustration the message exchange of FIG. 5 assumes that the access point 120 requires Wi-Fi Protected Access II (WPA2) Enterprise authentication and that a form of EAP authentication protocol is used with an AAA authentication server 140.

The access point 120 and the authentication server 140 may have a pre-established security association as depicted in FIG. 5 by the arrows between the two devices. Likewise, there may also be a security association between the authentication server 140 and the gateway 150. In some embodiments, the gateway 150 may be a network controller module comprising an OVS switch.

First, a beacon message 501 or other identifying signal may be transmitted from the access point 120. The communication device 110 may detect that an access network 130 is available on picking up the beacon message 501 transmitted from the access point 120. The beacon message 501 may further inform the communication device 110 that the access network 130 requires authentication (e.g., 802.1x WPA Enterprise authentication).

In response to detecting the beacon signal 501, the communication device 110 and access point 120 may negotiate and establish an 802.11 secure channel between the communication device 110 and the access point 120. To begin the process, once the communication device 110 discovers that the access point 120 requires WPA2 Enterprise authentication, the communication device 110 transmits an EAPOL-Start message 503 to the access point 120. The EAPOL-Start message 503 is a connection attempt to a resource in network 130.

In response to the EAPOL-Start message, the access point 120 requests the identity of the communication device 110 with an EAP-Request/Identity message 505.

The communication device 110, in turn, transmits to the access point 120 an EAP-Response message 507 containing, among other things, an identifier. The communication device 110 may include the identifier provided to it by a user of the communication device 110, and in some embodiments the identifier may be in the form of an NAI. Other identifiers may be transmitted in the EAP-Response message 507, such as a device identifier (e.g., MAC or IP address) or another user and/or application identifier.

On receiving the EAP-Response message 507, the access point 120 obtains the identifier from the message 507 and includes it in a RADIUS/Diameter Access-Request message 509 that is then sent to the authentication server 140 (e.g., an AAA RADIUS/Diameter server). The RADIUS/Diameter Access-Request message 509 may include the identifier (e.g., a NAI) and/or a RADIUS attribute "Calling Station-ID" that contains the MAC address of the communication device 110 wanting to connect to network 130. In some embodiments, depending on the domain name specified in the identifier (e.g., a NAI), the authentication server 140 may either authenticate the user and/or communication device 110 directly or pass on the request to another appropriate authentication server if a peering relationship exists.

In response to receiving and processing the RADIUS/Diameter Access-Request message 509, the authentication server 140 may in turn transmit a RADIUS/Diameter Access Challenge message 511 to the communication device 110 via access point 120. The access point 120 in turn decapsulates the RADIUS/Diameter Access Challenge message 511 and encapsulates it into an EAP-Access Challenge message 513 that is transmitted to the communication device 110. Based on the specific EAP authentication method used, further request responses may be sent between the authentication server 140 and the communication device 110. The access point 120, situated in between the authentication server 140 and the communication device 110, may encapsulate and decapsulate the RADIUS/Diameter messages to/from the authentication server 140 and the EAP messages to/from the communication device 110.

A successful authentication typically results in the derivation of keying material between the communication device 110 and the authentication server 140. This key is referred to as the Master key (MK). Both the authentication server 140 and the communication device 110 may derive a Pairwise Master Key (PMK) from the MK. Upon successful authentication, the authentication server 140 transmits a RADIUS/Diameter Access-Accept message 515 with the PMK to the access point 120.

In accordance with exemplary embodiments of the present invention, the authentication server 140 and gateway 150 exchange a message 517 that includes information about the new communication device 110 in order to establish a traffic flow rule. In some embodiments, messages, such as messages 517 are transmitted between the authentication server and the gateway 150 via a secure channel. The information about the new communication device 110 may include information to establish a traffic flow rule for traffic transmitted by the communication device (e.g., an identifier obtained during the authentication process). For example, the identifier may comprise the NAI and MAC address of the communication device 110, although in some embodiments other device, user, and/or application identifiers may be used.

As described above in connection with FIG. 3, in some embodiments, the authorization server 140 may provide the identifier to a rules function 160 in order to obtain one or more traffic flow rules from a rules database 165 associated with the identifier. In such embodiments, the message 517 may be the second message of FIG. 3, step 304 comprising, for example, the identifier and the obtained traffic flow rule.

In other embodiments where the gateway 150 obtains the traffic flow rule via the rules function 160 and rules database 165 based on an identifier, the message 517 may be the second message of FIG. 4, step 402 comprising the identifier. The gateway 150 may then use the identifier in message 517 to obtain one or more traffic flow rules from rules database 165 via the rules function 160.

As described above, the identifier may comprise a user identifier, a device identifier, and/or an application identifier. Examples of the identifier may include, e.g., a MAC address, a mobile phone number, an application ID (e.g., a social network ID), a Network Address Identifier (NM), an Internet Protocol (IP) address, an OpenID, an open standard for authorization (OAuth) identifier (e.g., an access token), a Shibboleth identifier, etc. Combinations of identifiers may also be used, e.g., a NAI and a MAC address. In some embodiments, message 517 may further include at least one of a user preference, a priority parameter, a quality of service parameter, a tunneling parameter, a device type parameter, a device identifier, and a time-to-live parameter.

Accordingly, an authentication or AAA server 140 may reprogram the virtual network infrastructure, such as gateway or OVS 150 in order to connect the communication device 110 to the correct virtual instance 130a-b. For example, referring to FIG. 1, the gateway 150 may be reprogrammed so that communication device 110 may be connected with the correct virtual instances, e.g., Operator A 130a or Operator B 130b. Once the network setup process is complete, traffic from communication device 110 may be appropriate routed. Thus, it is possible to couple the authentication phase and a network setup procedure together in order to enable communication from an operator's customers (e.g., communication device 110) in a hosting environment (e.g., network 130 with network operators' virtual instances 130a and 130b). This coupling is possible as the authentication server already has the information that is needed (e.g., the identity information) in order to establish a traffic flow rule for a communication device 110.

After successful authentication, the access point 120 transmits an EAP-Access accept message 519 comprising the MK to the communication device 110. The communication device 110 derives the PMK from the MK and uses it to perform a four-way handshake shown as messaging 521 with the access point 120 for negotiating WPA2 security. This handshake may result in a time-limited session key called Pairwise Transient Key (PTK) that protects any unicast traffic and a Groupwise Transient Key (GTK) that protects multicast traffic. Thus, a secure connection or session may be established between the communication device 110 and the access point 120 after successful authentication.

After establishing a secure session, user accounting information may be passed to the authentication or RADIUS server 140. For example, message 523 and 525 show the exchange of a RADIUS/Diameter Accounting-Request message (523) transmitted from the access point 120 to the RADIUS server 140 and an Accounting-Response message (525) transmitted from the RADIUS server 140 to the access point 120.

Message 526 shows the exchange of information after the communication device 110 traffic flow rule has been approved and established, e.g., the access point 120 and gateway 150 may communicate without first consulting the authentication server 140.

Message 527 reflects when the communication device 110 disconnects from the access network 130 either explicitly or due to a timeout. When the communication device disconnects (message 527), the access point 120 may inform the authentication server 140 of the disconnection with a RADIUS accounting-request message 529 to terminate the user session.

In response to receiving the RADIUS account-request message 529 to terminate the user session from the access point 120, the authentication server 140 may transmit an instruction 531 to the gateway or OVS switch 150 to modify the flow rule(s) previously established for the communication device 110. For example, the gateway 150 may delete the traffic flow rule and/or move the traffic flow rule to another database.

The authentication server 140 may further transmit a RADIUS/Diameter Accounting-Response message 533 account-request message 529, e.g., confirming successful termination of the user session.

It should be appreciated that the authentication server 140 may be used to program other network elements or nodes, such as routers, in addition to a SDN switch (e.g., OVS) or gateway 150. The precise configuration may depend on the user/device 110 that is connecting to network 130, and many authentication servers, such as AAA servers, already have domain specific information to be able to authenticate a user that is connecting to a network 130.

Figure 6:
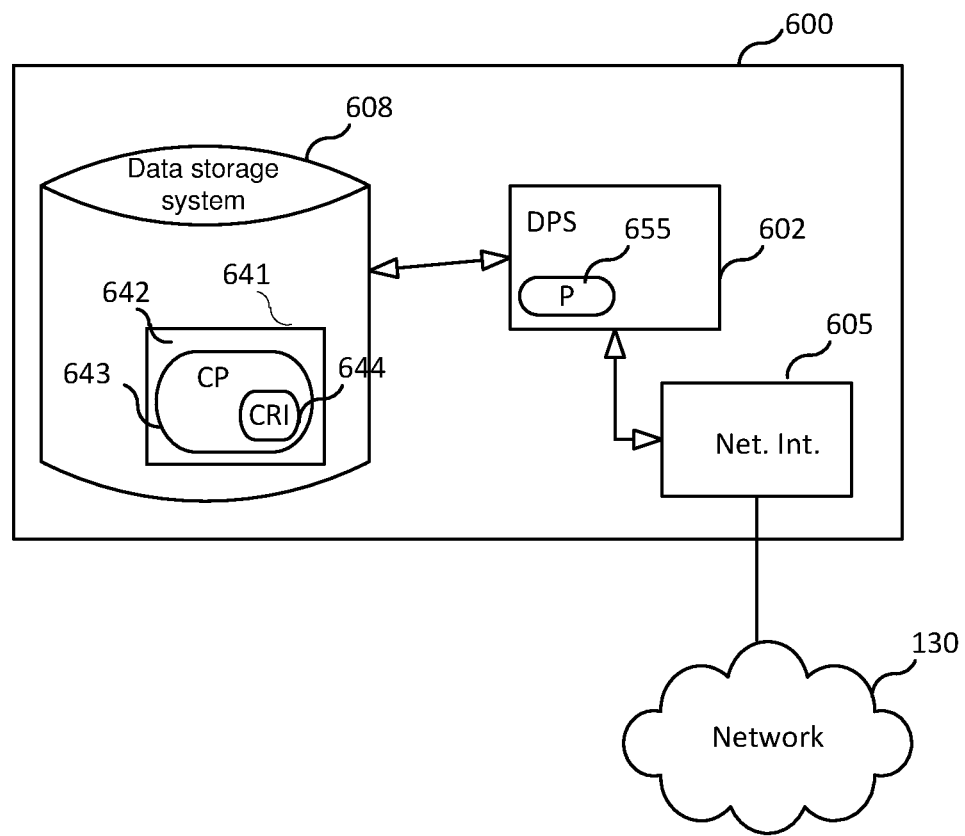
FIG. 6 is a block diagram of an authorization server apparatus according to some embodiments.

FIG. 6 is a block diagram of an authentication server apparatus 600, according to some embodiments. As shown in FIG. 6, authentication server apparatus 600 may include or consist of: a data processing system 602 (e.g., a computer), which may include one or more processors 655 (e.g., a microprocessor and/or one or more circuits, such as an application specific integrated circuit (ASIC), field-programmable gate arrays (FPGAs), a logic circuit, and the like); a network interface 605 for connecting apparatus 600 to a network 130; and a data storage system 608, which may include one or more non-volatile storage devices and/or one or more volatile storage devices (e.g., random access memory (RAM)).

In embodiments where apparatus 600 includes a processor 655, a computer program product (CPP) 641 may be provided. CPP 641 includes or is a computer readable medium (CRM) 642 storing a computer program (CP) 643 comprising computer readable instructions (CRI) 644 for performing steps described herein (e.g., one or more of the steps shown in FIGS. 2-5). CP 643 may include an operating system (OS) and/or application programs. CRM 642 may include a non-transitory computer readable medium, such as, but not limited, to magnetic media (e.g., a hard disk), optical media (e.g., a DVD), solid state devices (e.g., random access memory (RAM), flash memory), and the like.

In some embodiments, the CRI 644 of computer program 643 is configured such that when executed by computer system 602, the CRI causes the apparatus 600 to perform steps described above (e.g., steps described above and below with reference to the flow charts shown in the drawings). In other embodiments, the authentication server 600 may be configured to perform steps described herein without the need for a computer program. That is, for example, computer system 602 may consist merely of one or more ASICs. Hence, the features of the embodiments described herein may be implemented in hardware and/or software.

While various embodiments have been described above, it should be understood that they have been presented by way of example only, and not limitation. Thus, the breadth and scope of the present invention should not be limited by any of the above-described exemplary embodiments. Moreover, any combination of the above-described elements in all possible variations thereof is encompassed by the invention unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for routing traffic originating from a communication device, the method comprising:
   receiving, at an authentication server, a first message comprising information indicating that the communication device or a user of the communication device is requesting access to a resource;
   authenticating, by the authentication server, the communication device or the user of the communication device in accordance with an authentication protocol; and
   after the device or the user is authenticated, establishing a traffic flow rule for traffic transmitted by the device based on a first identifier, wherein the first identifier is a device identifier unique to the device, and
   wherein establishing the traffic flow rule comprises the authentication server transmitting to a network node a second message comprising the device identifier, the second message further comprises the obtained traffic flow rule, and the obtained traffic flow rule comprises traffic flow information identifying one or more traffic flows and traffic routing information for the identified traffic flows for enabling the network node to route traffic transmitted by the communication device and corresponding to one of the identified traffic flows to an appropriate network entity,
   wherein the second message further comprises a user identifier and/or an application identifier, and
   establishing the traffic flow rule further comprises the network node using the user or application identifier to obtain the traffic flow rule,
   wherein the method further comprises the authentication server or the network node transmitting the traffic flow rule to a second network node, wherein the second network node is configured to receive traffic transmitted by the communication device, and the traffic flow rule identifies a destination to which the second network node should forward the received traffic, and
   wherein the authentication server reprograms the network node through software-defined networking, SDN, mechanisms so that the communication device is connected with correct virtual instances serving group of customers.

2. The method of claim 1, wherein
   establishing the traffic flow rule further comprises the authentication server using the first identifier to obtain the traffic flow rule.

3. The method of claim 2, wherein using the first identifier to obtain the traffic flow rule comprises:
   the authentication server providing to a rules function the first identifier, wherein the rules function is configured to obtain a rule based on the first identifier and provide the selected rule to the authentication server; and
   the authentication server receiving the traffic flow rule obtained by the rules function based on the first identifier.

4. The method of claim 1, wherein the second message further comprises at least one of a user preference, a priority parameter, a quality of service parameter, a tunneling parameter, a device type parameter, a device identifier and a time-to-live parameter.

5. The method of claim 1, wherein the first identifier further comprises one of a user identifier and an application identifier.

6. The method of claim 2, wherein
   the network node is a gateway,
   the gateway is configured to receive a packet transmitted by the communication device,
   the traffic flow rule identifies a destination to which the gateway should forward the received traffic packet,
   the gateway determines the destination identified by the traffic flow rule, and
   the gateway forwards the received packet to the destination identified by the traffic flow rule.

7. The method of claim 1, further comprising:
   receiving, at the authentication server, a third message providing an indication to terminate a user session of the device; and
   transmitting, by the authentication server, a fourth message to the network node comprising instructions to modify one or more routing rules for the device.

8. The method of claim 1, wherein
   the network node is one of: a gateway and a node comprising a rules function, the network comprises a virtual switch, and
   the method further comprises the authentication server transmitting a message to an access point for permitting the communication device to access the resource.

9. An authentication server comprising:
   a data processing system; and
   a network interface coupled to the data processing system, wherein the data processing system is configured such that, in response to receiving a first message comprising information indicating that a communication device or a user of the communication device is requesting access to a resource, the data processing system:

authenticates the communication device or the user of the communication device in accordance with an authentication protocol; and after the communication device or the user is authenticated, establishes a traffic flow rule for traffic transmitted by the communication device based on a first identifier, wherein the first identifier is a device identifier unique to the device, and wherein establishing the traffic flow rule comprises the data processing system using the network interface to transmit to a network node a second message comprising the device identifier, the second message further comprises the obtained traffic flow rule, and the obtained traffic flow rule comprises traffic flow information identifying one or more traffic flows and traffic routing information for the identified traffic flows for enabling the network node to route traffic transmitted by the communication device and corresponding to one of the identified traffic flows to an appropriate network entity, wherein the second message further comprises the user identifier and/or the application identifier, and the network node is configured to use the user or application identifier to obtain the traffic flow rule, wherein the authenticating server transmits the obtained traffic flow rule to a second network node, wherein the second network node is configured to receive traffic transmitted by the communication device, and the traffic flow rule identifies a destination to which the second network node should forward the received traffic, and wherein the authentication server reprograms the network node through software-defined networking, SDN, mechanisms so that the communication device is connected with correct virtual instances serving group of customers.

10. The authentication server of claim 9, wherein the data processing system is configured such that the establishing the traffic flow rule further comprises using the first identifier to obtain the traffic flow rule.

11. The authentication server of claim 10, wherein the data processing system is configured such that, the using the first identifier to obtain the traffic flow rule further comprises:

providing to a rules function the first identifier, wherein the rules function is configured to select a rule based on the first identifier and provide the selected rule to the authentication server; and receiving the traffic flow rule selected by the rules function based on the first identifier.

12. The authentication server of claim 9, wherein the second message further comprises at least one of a user preference, a priority parameter, a quality of service parameter, a tunneling parameter, a device type parameter, a device identifier and a time-to-live parameter.

13. The authentication server of claim 9, wherein the authentication server is an Authentication, Authorization, and Accounting (AAA) server, the authentication protocol comprises at least one of a RADIUS or Diameter protocol, and the device identifier is one of an IP address and a MAC address.

14. The authentication server of claim 9, wherein the network node is configured to receive traffic transmitted by the communication device, and the traffic flow rule identifies a node to which the network node should forward the received traffic.

15. The authentication server of claim 9, the data processing system further configured to:

receive a third message providing an indication to terminate a user session of the communication device; and transmit, via the network interface, a fourth message to the network node comprising instructions to modify one or more routing rules for the communication device.

16. The authentication server of claim 9, wherein the network node is one of: a gateway and a node comprising a rules function, the network comprises a virtual switch, and the data processing system is further configured to use the network interface to transmit a message to an access point for permitting the communication device to access the resource.

* * * * *